Sept. 16, 1969  J. F. MacDOWELL  3,467,534
BARIUM SILICATE GLASS-CERAMIC BODY AND METHOD OF MAKING IT
Filed Oct. 12, 1964
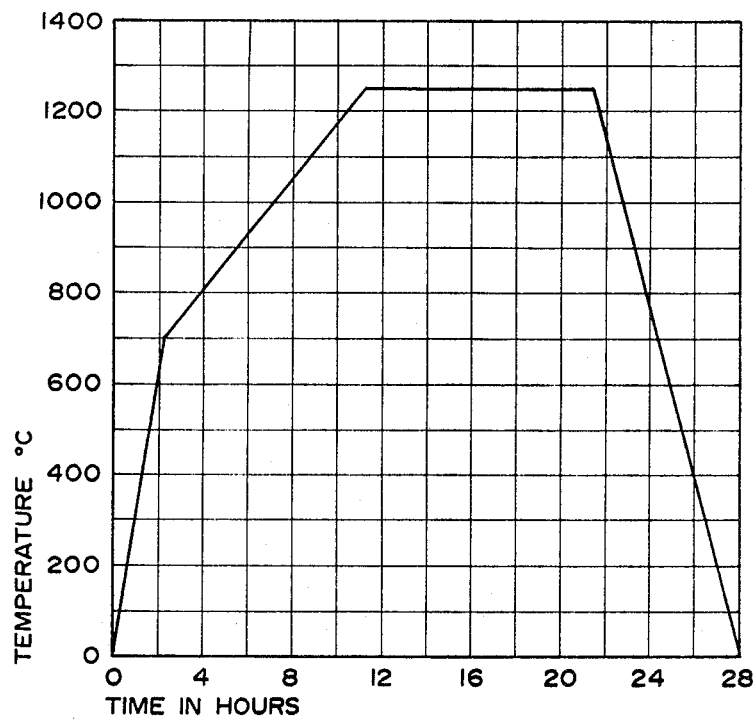
INVENTOR.
John F. MacDowell
BY
ATTORNEY

United States Patent Office 3,467,534
Patented Sept. 16, 1969

3,467,534
BARIUM SILICATE GLASS-CERAMIC BODY AND METHOD OF MAKING IT
John F. MacDowell, Painted Post, N.Y., assignor to Corning Glass Works, Corning, N.Y., a corporation of New York
Filed Oct. 12, 1964, Ser. No. 403,015
Int. Cl. C04b *35/16;* C03b *31/00;* C03c *3/22*
U.S. Cl. 106—39                                                                3 Claims

ABSTRACT OF THE DISCLOSURE

This invention relates to the manufacture of glass-ceramic articles consisting essentially of 20–70% BaO and 30–80% $SiO_2$ wherein the crystal content thereof comprises at least 50% by weight of the article and wherein the principal crystal phase is a barium silicate selected from the group consisting of $2BaO \cdot 3SiO_2$, $5BaO \cdot 8SiO_2$, $3BaO \cdot 5SiO_2$, high temperature $BaO \cdot 2SiO_2$, and low temperature $BaO \cdot 2SiO_2$.

---

The field of glass-ceramics or semicrystalline ceramics, as these bodies are frequently termed, resulted from the discovery by Stookey, described in United States Patent No. 2,920,971, that useful ceramic materials could be fabricated from special glass compositions. In brief, the production of glass-ceramics comprises compounding a glass-forming batch into which a nucleating or crystallization-promoting agent is incorporated, melting this batch, cooling and shaping this melt into a glass body of the desired configuration, and then heat treating this glass shape at particular time-temperature schedule depending upon the glass composition involved and the physical properties that are sought of the body. The heat treatment of the glass body converts it into a body consisting of relatively uniformly-sized, fine-grained crystals randomly oriented and substantially uniformly dispersed throughout a glassy matrix, these crystals constituting the major proportion of the body. In the production of conventional glass-ceramics, the nucleation catalyst causes the crystalline phases to nucleate and grow in situ, the predominantly crystalline structure of the article generally causing the physical properties thereof to be quite different from those of the starting glass. Hence, these physical properties are principally those of the internal crystals. Of great practical importance is the fact that because the crystallization ocurs in situ in the glass, the manufacture of substantially homogeneous bodies of fine-grained crystals which are essentially free of voids and non-porous is possible. Also, since the glass-ceramic is developed from a glass body, articles thereof can be fabricated utilizing the conventional methods of shaping glass such as blowing, casting, drawing, pressing, rolling, or spinning. Commercial applications for glass-ceramics have included dinnerware and culinary ware, electrical resistors and capacitors, and missile nose cones.

Many types of internal nuclei have been precipitated in glasses. These include: (1) metallic particles, e.g., copper, silver, and gold; (2) fluoride or oxide crystals, e.g., $ZrO_2$, $CaF_2$, $TiO_2$, $Cr_2O_3$, and $SnO_2$; and (3) nuclei in the form of dispersions of tiny liquid droplets which are believed to crystallize upon heating.

As has been noted, the physical and chemical properties of a glass-ceramic are largely dependent upon the identity of the crystals developed within the base glass. And, it follows then, that the use for which a glass-ceramic body is suited is also dependent upon the internal crystals thereof. It has been recognized that a high strength glass-ceramic which is stable at high temperatures, has relatively good resistance to thermal shock, possesses good electrical insulating properties, and exhibits good transmission of visible radiations even at very high temperatures could have many commercial applications. Of course, the body should also have satisfactory chemical durability and the original glass should not have a strong tendency to crystallize as the melt is being cooled or during reworking. One further useful property would be the ability to accept a low expansion glaze or glass coating which would result in a surface compression layer thereon and thus greatly increase the mechanical strength thereof. Such products would be useful for microwave windows, electrical insulators, high strength porcelain-type products, and high temperature lamp envelopes.

Therefore, the principal object of this invention is to provide glass-ceramic bodies having high intrinsic strength, good thermal stability, good electrical insulating properties, exhibiting good transmission of visible radiations even at high temperatures, and having the ability to accept a low expansion glaze.

Other objects will become apparent from the following description and the appended drawing which records a time-temperature curve for the heat treatment of the preferred embodiment of the invention.

I have discovered that certain binary $BaO-SiO_2$ glasses not only nucleate and crystallize in situ without a catalyst, but apparently do so without the usually necessary first step of liquid emulsion formation. Thus, I have discovered that certain glass compositions in the $BaO-SiO_2$ system, viz., 20–70% by weight BaO and 30–80% by weight $SiO_2$, as calculated from the batch on the oxide basis, when subjected to a controlled heat treating schedule will be converted into semicrystalline ceramic bodies having the desirable physical and chemical properties recited above. The preferred compositions range generally within the $2BaO \cdot 3SiO_2$-$BaO \cdot 2SiO_2$ subsystem (between about 30 and 40 mole percent BaO). There are five crystalline phases that have been observed within this dibarium trisilicate-barium disilicate subsystem. These are: $2BaO \cdot 3SiO_2$, $5BaO \cdot 8SiO_2$, $3BaO \cdot 5SiO_2$, and the high and low temperature forms of $BaO \cdot 2SiO_2$. The most recently published phase work in this subsystem is that reported by Roth and Levin in the Journal of Research of the National Bureau of Standards, 62, 193–200, 1959. The binary phases obtained in the crystallization of the present glasses were compared with those observed during the quench studies of Roth and Levin utilizing X-ray diffraction analysis.

In its broadest aspects, my invention comprises melting a glass-forming batch containing about 20–70% by weight of BaO and 30–80% by weight of $SiO_2$, cooling this melt and forming a glass shape therefrom, and thereafter exposing this glass shape to a temperature between about 700°–1300° C. for a time sufficient to attain the desired crystallization.

In the following examples, the batch materials were dry-mixed and melted in two pound batches in open platinum crucibles for about six hours at 1600° C. in electric furnaces. The melts were stirred for one-half hour to obtain maximum homogeneity, allowed to fine about one-half hour in situ, and subsequently poured upon a cold steel plate to form discs approximately 6" in diameter x ¼" thick. The cooled glass patties were then placed in an annealing oven at 600°–650° C. for one hour and cooled slowly to room temperature. The annealed glass patties, or strips cut therefrom, were thereafter transferred to a furnace and heated in accordance with various time-temperature cycles as recorded in Table II set out hereinafter to convert the glass to a glass-ceramic. Finally, the crystallized shapes were cooled to room temperature.

Although no nucleation catalyst as such is incorporated into these compositions, the mechanism of incident crystallization is analogous to that occurring during the production of conventional glass-ceramics. Thus, as the glass is heated above its annealing point, nuclei are first formed which provide sites for the development of crystals. It is well-recognized that the crystallization of a glass during heat treatment proceeds more rapidly as the temperature approaches the liquidus of the crystal phase. However, although the crystals possess a melting point higher than the softening point of the glass in the initial stages of crystallization the proportion of crystals to glassy matrix is very small and the article will not maintain its shape if the temperature thereof is raised too rapidly beyond its softening point. Hence, the rate of temperature increase must be in substantial agreement with the rate of crystallization. Otherwise, deformation resulting from a lowering of he viscosity will render the final product generally of little utility.

In order to be assured of obtaining a body which is densely crystallized and which is little, if any, deformed during heat treatment, I prefer to raise the temperature at about 1° C./minute as the body is heated above the softening point of the glass. More rapid rates, i.e., 5° C./ minute and even higher, have been used successfully, particularly where the glass has been supported on such auxiliary means as formers or if the glass is held for a period of time at a temperature near the cooler end of the crystallization range to permit extensive nucleation and grow.h of crystals. In other words, the crystal growth in any event must be such as to form a supporting structure within the glass, thereby restraining the body from deforming.

The rate at which the glass body can be heated from room temperature to the beginning of the crystallization range is primarily dependent upon the thermal shock resistance of the glass and the size and geometry of the shape involved. In the following examples, the glasses were heated at a rate of about 5° C./minute to about 700° C. to be certain of avoiding breakage. However, small pieces of these glasses have been plunged directly into a furnace maintained as high as 900° C. with no breakage. It will be appreciated, however, that in such instances these pieces deformed considerably during crystallization.

The rate at which the glass-ceramic body can be cooled after the heat treatment is also based upon the thermal shock resistance of the material and the size and geometry of the article. These semicrystalline materials have coefficients of thermal expansion (0°–300° C.) ranging from about 100–130×10$^{-7}$/° C. In the following examples, the heat to the electric furnace was simply cut off and the furnace allowed to cool to room temperature at its own rate (averaging about 3° C./minute). Much more rapid rates of cooling can be used without resulting in breakage, it being possible to take small articles directly out of the furnace after heat treatment and allowing them to cool in the air.

A further modification in preparing the glass body for heat treatment is possible. Thus, the heat treatment may be performed immediately following the shaping of the glass while it is still hot rather than cooling the glass article to room temperature and thereafter reheating to cause crystallization thereof. Hence, the glass shape may be merely cooled to just below the transformation point, i.e., the temperature at which the liquid melt is deemed to become a glass solid, this temperature being in the vicinity of the annealing point of the glass, and then subjected to the heat treatment schedule. This practice, it will be readily appreciated, results in a more efficient and economical use of heat although it has the disadvantage of precluding easy visual inspection of the glass for faults and imperfections.

My preferred heat treatment procedure comprises a two-step schedule. Thus, although a satisfactorily crystallized article can be secured by simply raising the temperature of the glass article to between about 700°–1300° C. and maintaining this temperature for a period of time sufficient to achieve the desired crystallization, I have found that deformation of the body is minimized where a relatively short holding period at the lower end of crystallization range is employed or where the temperature is raised quite slowly at the lower end of this range. This dwell time enables a substantial amount of crystallization to be initiated, thereby providing a sound supporting structure to maintain the geometry of the body as the temperature is raised to expedite further crystallization. Thus, the glass articles are frequently maintained for about one hour or more between 700°–800° C. before being raised to a higher temperature.

The speed of crystallization follows a time-temperature relationship. Hence, a very long period of time, 24 hours and, perhaps, even longer, will be required to attain the desired substantially complete crystallization at 700° C., while at 1300° C. crystallization may be completed within an hour or less. However, as has been emphasized above, to insure the production of articles showing no substantial deformation, the rate of temperature increase must balance the decrease in viscosity of the body. Longer heat treating times are, of course, possible but not usually economically practical.

Rephrasing the process steps of my invention in the simplest terms, the method of producing glass-ceramics of the $BaO-SiO_2$ field comprises: (1) melting a glass-forming batch; (2) cooling the melt at least below the transformation point of the glass articles shaped therefrom; and (3) heat treating the glass article above about 700° C., but not more than about 1300° C., for a time sufficient to attain the desired crystallization.

The ranges of BaO and $SiO_2$ recited above have been found to be critical to the invention. Compositions containing more than about 70% by weight BaO are very difficult to cool to a glass even utilizing quenching techniques, i.e., the glass devitrifies upon cooling resulting in a coarsely crystalline structure. Where less than about 20% by weight BaO is present, crystallization upon heat treatment is not sufficient to prevent deformation of the body.

Certain compatible metal oxides may also be present provided their total amount preferably does not exceed about 20% by weight of the batch and individually do not exceed the proportions set out below. Where more than about 20% by weight of these oxides is added to the batch, the basic desirable properties of the $BaO-SiO_2$ product are diluted, perhaps through the incorporation of these in the crystal structure of the $BaO-SiO_2$ or the change in composition of the residual glass remaining after the heat treatment.

I have discovered that the addition of SrO to the batch is particularly advantageous in improving the thermal stability of the body, i.e., the maximum temperature at which the body can be used without failure. Thus, such articles have withstood temperatures of 1320°–1350° C. for long periods of time. These additions may be in amounts up to about 20% by weight of the batch and have added utility of helping to maintain the transparent-translucent quality of the body to very high temperatures. In some compositions, the glass-ceramic tends to develop greater opacity when held at high temperatures for long periods.

The alkali metal oxides, $Na_2O$, $K_2O$, $Rb_2O$, and $Cs_2O$, may advantageously be present in an amount totalling about 10% by weight. These act to improve the glass quality and help to arrest the phase separation of high silica melts as they are cooled to glasses. $Li_2O$ appears to cause the melt to devitrify upon cooling and, therefore, is preferably absent from the batch.

Other compatible metal oxides which may be present in the batch in an amount totalling about 10% by weight include PbO, CdO, $La_2O_3$, $ThO_2$, $CeO_2$, and $WO_3$. These oxides modify the properties of the glass-ceramic in various ways, PbO being especially noteworthy in that it gives a fluorescent effect to the crystals.

Still other modifying compatible metal oxides which may be added but only in amounts up to about 5% total are CaO, ZnO, $Ta_2O_5$, and $V_2O_5$. Finally, MnO, FeO, $Al_2O_3$, CoO, $B_2O_3$, and NiO, may be present but only in an amount totalling about 3% by weight.

Table I sets forth examples of glasses having compositions within the above-recited ranges of the invention, calculated from their respective batches on the oxide basis in weight percent, exclusive of minor impurities which may be present in the batch materials. It will be appreciated that the batches may be composed of any materials, either oxides or other compounds, which on being melted homogeneously together are converted to the desired oxide compositions in the desired proportions.

Table II records the heat treating schedule and the crystal phase(s) present in each body, as determined by X-ray diffraction analysis, as well as some measurements of modulus of rupture (p.s.i.), coefficient of thermal expansion ($\times 10^{-7}/°$ C.) and density (g./cc.) made on the bodies. These latter determinations were made in accordance with conventional procedure, the modulus of rupture analyses is being made on abraded samples. Although the crystal structure and physical properties were not determined in every composition studied, each of the recorded examples represents a batch which was actually melted and heat treated in accordance with the method of this invention. Each of these bodies were transparent-translucent in appearance after heat treatment.

TABLE I

|  | 1 | 2 | 3 | 4 | 5 | 6 | 7 |
|---|---|---|---|---|---|---|---|
| BaO | 63 | 61.5 | 60.5 | 59.3 | 56 | 50 | 30 |
| $SiO_2$ | 37 | 38.5 | 39.5 | 40.7 | 44 | 50 | 70 |

|  | 8 | 9 | 10 | 11 | 12 | 13 | 14 |
|---|---|---|---|---|---|---|---|
| BaO | 50 | 40 | 50 | 50 | 50 | 50 | 50 |
| $SiO_2$ | 40 | 40 | 40 | 45 | 45 | 49 | 40 |
| SrO | 10 | 20 |  |  |  |  |  |
| CdO |  |  | 10 |  |  |  |  |
| $K_2O$ |  |  |  | 5 |  |  | 10 |
| $Cs_2O$ |  |  |  |  | 5 |  |  |
| $Al_2O_3$ |  |  |  |  |  | 1 |  |

|  | 15 | 16 | 17 | 18 | 19 | 20 | 21 |
|---|---|---|---|---|---|---|---|
| BaO | 50 | 50 | 50 | 50 | 50 | 50 | 50 |
| $SiO_2$ | 45 | 45 | 45 | 45 | 45 | 45 | 45 |
| $Na_2O$ | 5 |  |  |  |  |  |  |
| $Rb_2O$ |  | 5 |  |  |  |  |  |
| CaO |  |  | 5 |  |  |  |  |
| PbO |  |  |  | 5 |  |  |  |
| $La_2O_3$ |  |  |  |  | 5 |  |  |
| $ThO_2$ |  |  |  |  |  | 5 |  |
| $CeO_2$ |  |  |  |  |  |  | 5 |

|  | 22 | 23 | 24 | 25 | 26 | 27 | 28 | 29 |
|---|---|---|---|---|---|---|---|---|
| BaO | 60 | 50 | 50 | 60 | 60 | 50 | 50 | 55 |
| $SiO_2$ | 35 | 45 | 45 | 35 | 35 | 45 | 40 | 42.5 |
| $B_2O_3$ | 5 |  |  |  |  |  |  |  |
| CdO |  | 5 |  |  |  |  |  |  |
| $Ta_2O_5$ |  |  | 5 |  |  |  |  |  |
| $Cs_2O$ |  |  |  | 5 |  |  |  |  |
| ZnO |  |  |  |  | 5 |  |  |  |
| $V_2O_5$ |  |  |  |  |  | 5 |  |  |
| $WO_3$ |  |  |  |  |  |  | 10 |  |
| SrO |  |  |  |  |  |  |  | 2.5 |

TABLE II

| Example No. | Heat Treatment | Crystal Phases | Exp. Coeff. | Mod. of Rupture | Density |
|---|---|---|---|---|---|
| 1 | 700°–850° C. at 60° C./hr.; 850° C.—1 hr. | $2BaO \cdot 3SiO_2$ | 110 |  | 3.960 |
| 2 | do | $2BaO \cdot 3SiO_2$ | 115 |  | 3.903 |
| 3 | do | $3BaO \cdot 5SiO_2$ | 117.4 | 23,000 | 3.823 |
| 4 | do | $3BaO \cdot 5SiO_2$ | 121.7 |  | 3.794 |
| 5 | do | Low $BaO \cdot 2SiO_2$ | 126.3 |  | 3.683 |
| 6 | 700° C.—2 hrs.; 700°–1,000° C. at 5° C./min.; 1,000° C.—6 hrs. |  | 134.1 |  | 3.479 |
| 7 | do |  |  |  |  |
| 8 | 700° C.—2 hrs.; 700°–850° C. at 5° C./min.; 850° C.—4 hrs. |  | 102.0 |  | 3.780 |
| 9 | do |  |  |  |  |
| 10 | do |  |  |  |  |
| 11 | 700° C.—2 hrs.; 700°–860° C. at 5° C./min.; 860° C.—6 hrs. |  | 122.4 |  | 4.050 |
| 12 | 700° C.—2 hrs.; 700°–1,100° C. at 5° C./min.; 1,100° C.—6 hrs. |  | 124.9 |  | 3.656 |
| 13 | 700° C.—2 hrs.; 700°–1,010° C. at 5° C./min.; 1,010° C.—4 hrs. |  | 132.6 |  | 3.519 |
| 14 | 700° C.—2 hrs.; 700°–850° C. at 5° C./min.; 850° C.—4 hrs. |  |  |  |  |
| 15 | 700° C.—2 hrs.; 700°–860° C. at 5° C./min.; 860° C.—6 hrs. |  |  |  |  |
| 16 | 700° C.—2 hrs.; 700°–850° C. at 5° C./min.; 850° C.—6 hrs. |  |  |  |  |
| 17 | 700° C.—2 hrs.; 700°–1,010° C. at 5° C./min.; 1,010° C.—4 hrs. |  |  |  |  |
| 18 | 700° C.—2 hrs.; 700°–850° C. at 5° C./min.; 850° C.—6 hrs. |  | 131.8 |  | 3.715 |
| 19 | do |  | 134.4 |  | 3.722 |
| 20 | do |  |  |  |  |
| 21 | do |  |  |  |  |
| 22 | do |  |  |  |  |
| 23 | do |  |  |  |  |
| 24 | do |  |  |  |  |
| 25 | do |  |  |  |  |
| 26 | do |  |  |  |  |
| 27 | do |  |  |  |  |
| 28 | 600° C.–860° C. at 60° C./hr.; 860° C.—6 hrs. |  |  |  |  |
| 29 | 700°–1,250° C. at 60° C./hr.; 1,250° C.—10 hrs. | $3BaO \cdot 5SiO_2$ | 115 | 20,000 | 3.90 |

Table III records the physical properties of my preferred composition, viz., Example 29:

TABLE III

| | |
|---|---|
| Principal crystal phase | $3BaO \cdot 5SiO_2$ |
| Expansion coefficient, °C. | $120 \times 10^{-7}$ |
| Density | 3.75 |
| Porosity and permeability | 0.00 |
| Modulus of rupture p.s.i. | 22,000 |
| Modulus of rupture (coated with a 62 expansion glaze) p.s.i. | 60,000 |
| Electrical properties (25° C.) | |
| Dielectric constant ($10^6$ C.) | 7.5 |
| Loss tangent ($10^6$ C.) | $4 \times 10^{-4}$ |
| D.C. Resistivity ohm-cm | $10^{16}$ |

It can be observed that this material possesses very good electrical insulating properties which, when coupled with its moderately high coefficient of expansion, has resulted in its being considered as a coating for metals. Also, its high intrinsic strength coupled with the very high strength which can be developed through coating with a low expansion glaze makes it practical for porcelain-type products.

Laboratory tests have demonstrated that the total content of the glass-ceramic articles is dependent upon the extent to which the batch constituents are adaptable to the formation of crystal phases. Nevertheless, it has been determined that this crystal content is greater than 50% by weight and is generally in excess of 75% by weight. The crystals, themselves, are relatively uniform in size, substantially all of which are smaller than 30 microns in diameter.

The accompanying drawing sets out a time-temperature curve for the heat treatment of the preferred embodiment of my invention, viz., Example 29. Thus, a two pound batch composed of sand, barium carbonate, and strontium carbonate in the proper proportions to yield the oxide analysis set out in Table I was dry-mixed and melted in an open platinum crucible for sixe hours at 1600° C. The melt was poured upon a cold steel plate to give a disc about 6" in diameter x ¼" thick, and this disc was annealed and cooled slowly to room temperature. The patty was then transferred to an electric furnace and the temperature raised therein at 5° C./minute to 700° C. Thereafter, the temperature was raised at 60° C./hr. to 1250° C., maintained thereat for 10 hours, and then the heat to the furnace was cut off and the furnace allowed to cool to room temperature at its own rate (about 3° C./minute) with the disc retained therein.

I claim:

1. A glass-ceramic article wherein the crystal content thereof comprises at least 50% by weight of the article and wherein a barium silicate selected from the group consisting of $2BaO \cdot 3SiO_2$, $5BaO \cdot 8SiO_2$, $3BaO \cdot 5SiO_2$, high temperature $BaO \cdot 2SiO_2$ and low temperature $BaO \cdot 2SiO_2$ constitutes the principal crystal phase, said crystals being substantially all smaller than about 30 microns in diameter and being formed through the crystallization in situ of a glass body consisting essentially, by weight as calculated from the batch on the oxide basis, of about 20–70% BaO and 30–80% $SiO_2$, the sum of said BaO and $SiO_2$ comprising at least 80% by weight of said glass body, and up to 20% by weight total of at least one metal oxide in no more than the indicated maximum effective proportion selected from the group consisting of 0–20% SrO, 0–10% total of $Na_2O$, $K_2O$, $Rb_2O_3$, and $Cs_2O$, 0–10% total of PbO, CdO, $La_2O_3$, $ThO_2$, $CeO_2$, and $WO_3$, 0–5% total of CaO, ZnO, and $V_2O_5$, and 0–3% total of MnO, $Ta_2O_5$, FeO, $Al_2O_3$, CoO, and NiO.

2. A method for making a glass-ceramic article wherein the crystal content thereof is at least 50% by weight of the article, wherein said crystals are substantially all smaller than about 30 microns in diameter, and wherein a barium silicate selected from the group consisting of $2BaO \cdot 3SiO_2$, $5BaO \cdot 8SiO_2$, $3BaO \cdot 5SiO_2$, high temperature $BaO \cdot 2SiO_2$, and low temperature $BaO \cdot 2SiO_2$ constitutes the principal crystal phase which comprises:

(a) melting a glass-forming batch consisting essentially, by weight on the oxide basis, of about 20–70% BaO and 30–80% $SiO_2$, the sum of said BaO and $SiO_2$ constituting at least 80% of said batch, and up to 20% by weight total of at least one metal oxide in no more than the indicated maximum effective proportion selected from the group consisting of 0–20% SrO, 0–10% total of $Na_2O$, $K_2O$, $Rb_2O_3$, and $Cs_2O$, 0–10% total of PbO, CdO, $La_2O_3$, $ThO_2$, $CeO_2$, and $WO_3$, 0–5% total of CaO, ZnO, and $V_2O_5$, and 0–3% total of MnO, $Ta_2O_5$, FeO, $Al_2O_3$, CoO, and NiO;

(b) simultaneously cooling the melt at least below the transformation point thereof and shaping a glass article therefrom;

(c) heating said glass article between about 700°–1300° C. for a period of time sufficient to attain the desired crystallization; and then (d) cooling said crystallized article to room temperature.

3. A method according to claim 2 wherein said time sufficient to attain the desired crystallization ranges about 1–24 hours.

References Cited

UNITED STATES PATENTS

| | | | |
|---|---|---|---|
| 2,920,971 | 1/1960 | Stookey | 106—39 |
| 3,022,179 | 2/1962 | Morrissey | 106—39 |

OTHER REFERENCES

Thomas, R. H.: Phase Equilibrium in a Portion of the Ternary System $BaO—Al_2O_3—SiO_2$ in J. Amer. Cer. Soc., vol. 33, No. 2, 1950 pp. 40–43.

HELEN M. McCARTHY, Primary Examiner

W. R. SATTERFIELD, Assistant Examiner

U.S. Cl. X.R.

65—33; 106—52